March 30, 1943. L. A. STENGEL ET AL 2,315,139
PROCESS FOR SEPARATION OF FURFURYLAMINES
Filed June 23, 1941
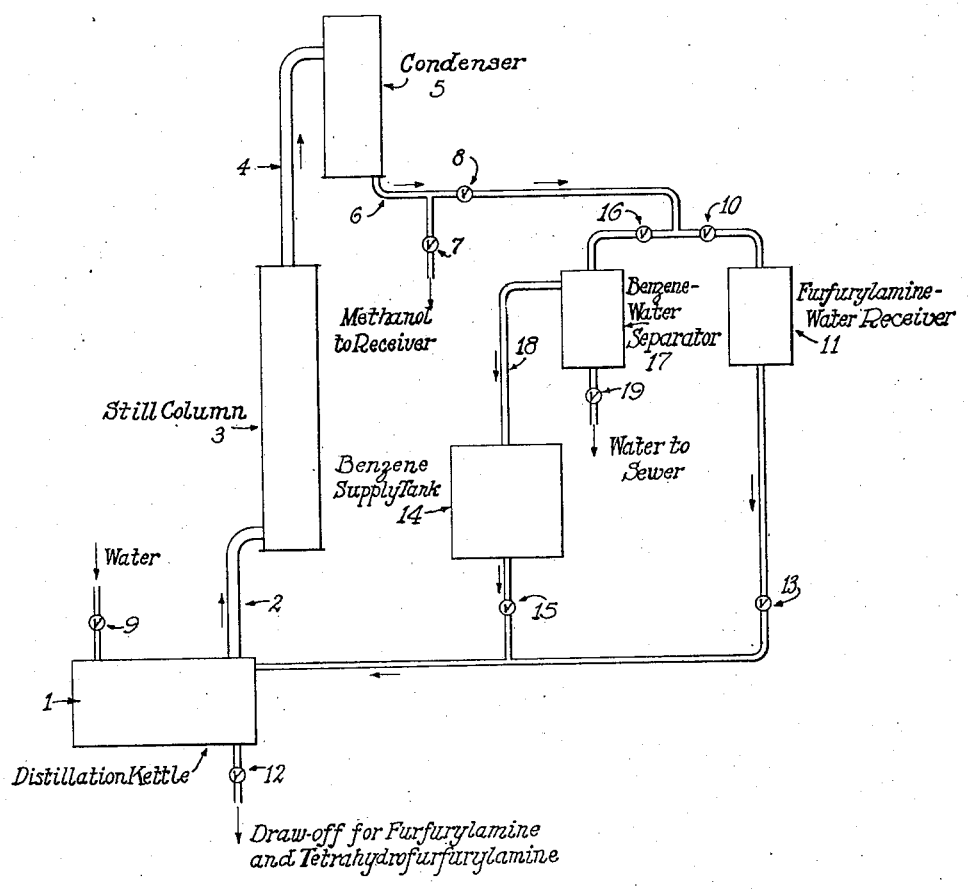
Inventor:
Leonard A. Stengel &
Walter K. Loughlin
By Francis M. Crawford
Attorney.

Patented Mar. 30, 1943

2,315,139

UNITED STATES PATENT OFFICE 2,315,139

PROCESS FOR SEPARATION OF FURFURYLAMINES

Leonard A. Stengel and Walter K. O'Loughlin, Terre Haute, Ind., assignors to Commercial Solvents Corporation, Terre Haute, Ind., a corporation of Maryland Application June 23, 1941, Serial No. 399,432

8 Claims. (Cl. 202—42)

The present invention relates to a process for separating furfurylamine from liquids which boil at temperatures relatively close to the boiling point of furfurylamine. More specifically, it relates to a method for separating furfurylamine from tetrahydrofurfurylamine, or from various mixtures which contain tetrahydrofurfurylamine.

In the production of furfurylamine or tetrahydrofurfurylamine either by liquid phase or vapor phase hydrogenation methods, there are found, almost without exception, appreciable quantities of both amines, regardless of whether furfurylamine or tetrahydrofurfurylamine is the sole compound desired. Even though both compounds are, in the pure state, useful in industry as intermediates in the synthesis of numerous valuable compounds, particularly those of the type utilized as rubber accelerators, it is difficult to separate such materials by means of common distillation procedures, due to their comparatively close boiling points. Although it may be possible to separate such compounds on a small scale by the use of certain types of multiple plate fractionating columns, it is not commercially practical to effect the separation of these amines by such methods, in view of the fact that said methods are time-consuming. Also, the cost of the necessary equipment involved in carrying out such an operation, on a commercial scale, would be prohibitive.

In spite of the fact that furfurylamine and tetrahydrofurfurylamine possess a marked affinity for one another, and boil only a few degrees apart, i. e., 144° C., and 153° C., respectively, we have discovered a commercially practical method whereby these two compounds may be readily and efficiently separated from each other. The present invention is based upon the discovery that furfurylamine forms an azeotropic mixture with water, boiling at 99° C., at atmospheric pressure and containing approximately 26% furfurylamine. Tetrahydrofurfurylamine is incapable of forming such an azeotrope. This phenomenon is indeed unexpected, since furfurylamine and tetrahydrofurfurylamine are both infinitely soluble in water.

In carrying out our new process, water is added to a mixture of furfurylamine and tetrahydrofurfurylamine in amounts sufficient to effect complete removal of furfurylamine in the form of a constant boiling mixture with said water. A total separation of furfurylamine from the mixture is evidenced by the fact that the temperature is observed to rise from 99° C., the boiling point of the furfurylamine-water azeotrope, to 100° C., at which temperature water alone is recovered. On continued distillation, pure tetrahydrofurfurylamine is collected at 153° C. The furfurylamine, present in the constant boiling fraction, may be readily obtained in a pure state by any suitable means such as by adding benzene or some other suitable liquid which is capable of forming a binary azeotropic mixture with water, and distilling, or by the use of dehydrating salts, or other suitable means. In this connection, it is to be specifically understood that any liquid which is capable of forming an azeotropic mixture with water and which is substantially inert under the distillation conditions employed is to be regarded as an equivalent of benzene.

In distilling this mixture of water, furfurylamine and benzene, the water layer is continuously withdrawn from the distillate, and the benzene returned to the still until all of the water has been removed therefrom. The benzene remaining in the still at this point, may be easily separated from the furfurylamine by fractional distillation, in the usual manner. Pure furfurylamine boiling at 144° C. is then secured on further distillation.

The present invention may be employed in the separation of furfurylamine from various mixtures containing tetrahydrofurfurylamine. For example, mixtures of the type obtained by catalytically reducing furfurylamine in the liquid phase, as described in our co-pending application, U. S. Serial No. 399,743, filed June 25, 1941, may be treated in accordance with the present invention to obtain separately furfurylamine and tetrahydrofurfurylamine in a pure state. Furthermore, the process, as described above, may be applied to any mixture of liquids containing furfurylamine, provided the boiling temperatures of the additional constituents, or any azeotropic mixtures of such constituents, or any azeotropic mixture consisting of one or more of such constituents and water, are sufficiently remote from the boiling temperature of the furfurylamine-water azeotrope, and providing such additional constituents do not also form constant boiling mixtures with water or furfurylamines.

The accompanying drawing is a diagrammatical representation of a particular design of apparatus, which may be employed in carrying out one form of the present invention, such as, for example, the separation of furfurylamine from a mixture of water, methanol and tetrahydrofurfurylamine. The kettle 1 is heated, in any convenient manner, so as to produce methanol vapors, which rise through vapor line 2, to still column 3 and from there through vapor line 4 to condenser 5. The liquid methanol formed in condenser 5, flows by pipe 6 through the open valve 7 to a suitable receiver. After all of the methanol has been thus removed, valve 7 is closed, valve 8 opened, and additional water added from an external source through valve 9 to distillation kettle 1, in order to insure the complete removal of the furfurylamine contained therein. Heat is then applied to distillation kettle 1, so as to form an azeotropic mixture of furfurylamine and water, which after being converted into liquid form in condenser 5, is conducted through pipe 6 and through valves 8 and 10 to receiver 11, where it is retained until all of the furfurylamine and water have been removed from distillation kettle 1. When this stage of the process is reached, valve 12 is opened and substantially pure tetrahydrofurfurylamine is withdrawn from distillation kettle 1. Thereafter, valve 13 is opened and the furfurylamine-water constant boiling mixture contained in receiver 11 introduced into distillation kettle 1. Benzene from tank 14, is then introduced into distillation kettle 1 through valve 15, in an amount sufficient to remove in the form of an azeotropic mixture, all of the water contained in the furfurylamine-water solution. Heat is again applied to distillation kettle 1, to produce an azeotropic mixture of benzene and water, which is subsequently condensed in condenser 5, conducted through pipe 6 and valve 8 to valve 16, which is opened and the benzene-water mixture conducted into gravity separator 17, in which stratification of the benzene and water occurs. The benzene layer in said separator gradually rises and overflows through pipe 18 into tank 14, where it is stored for re-use. As the separator 17 gradually becomes filled with water, valve 19 is opened intermittently and the water run to the sewer. After all of the water has been thus removed from the distillation kettle 1, the application of heat to the said kettle is continued for a short time in order to remove the last traces of benzene. When this object has been accomplished, the heating operation is discontinued and the resulting furfurylamine is withdrawn from distillation kettle 1 by opening valve 12.

The following example, to which, however, the present invention is not restricted, is illustrative of the nature of the present invention.

*Example*

A mixture resulting from the reduction of a solution originally consisting of 160 parts of methanol and 400 parts of furfurylamine and containing tetrahydrofurfurylamine, furfurylamine, methanol, and water, was subjected to distillation at atmospheric pressure, to remove the methanol therefrom. A total of 90 parts of water was then added to the resulting mixture, and the furfurylamine present therein distilled off as a constant boiling mixture with water, at 99° C. When all of the furfurylamine had been removed in this manner, the temperature rose to 100° C., and a fraction consisting solely of water, was collected. After complete removal of the water, the distillation temperature immediately rose to 151° C. The portion obtained at this temperature consisted principally of tetrahydrofurfurylamine. Upon refractionation, 336 parts of pure tetrahydrofurfurylamine, boiling at 153° C., was collected. The furfurylamine-water binary, constituting the original distillate, was treated with approximately 50 parts of benzene, and upon distillation, water was removed therefrom in the form of a constant boiling mixture with benzene, the benzene being returned to the still until all of the water had been recovered from the original furfurylamine-water azeotrope. A small quantity of benzene, present with the furfurylamine in the still residue, was separated therefrom by means of simple distillation, after which pure furfurylamine, boiling at 144° C., was collected. This fraction amounted to 28 parts.

The degree of purity of the furfurylamine and tetrahydrofurfurylamine, obtained in the manner described above, is indicated by the data appearing immediately below:

|  | $d_{20°}^{20°}$ | $n_D^{20°}$ |
|---|---|---|
| Furfurylamine | 1.0570 | 1.49077 |
| Tetrahydrofurfurylamine | 0.9770 | 1.45513 |

While we have illustrated our invention by certain application, we do not wish to limit ourselves to such specific cases, since furfurylamine may be separated from various mixtures thereof in the same general manner. In addition, although we have emphasized the applicability of the present invention to batch processes, it is likewise intended to cover continuous processes based upon the principle herein disclosed. Thus, for example, the furfurylamine-tetrahydrofurfurylamine mixture may be distilled, and the vapors conducted through a suitable column, down which water is flowing. By this method the tetrahydrofurfurylamine is condensed, and returned to the still, and the furfurylamine removed at the top of said column in the form of an azeotropic mixture with water, and recovered.

Our invention now having been described, what we claim is:

1. In a process for the separation of furfurylamine from admixture with other liquids incapable of forming azeotropes therewith or with water, and which cannot be separated from furfurylamine by straight distillation, the step which comprises adding water to the furfurylamine-containing mixture, and distilling off the resultant furfurylamine-water azeotrope.

2. In a process for the separation of furfurylamine from mixtures comprising tetrahydrofurfurylamine, furfurylamine, and other liquids incapable of forming azeotropes with said furfurylamine or with water, and which cannot be separated from furfurylamine by straight distillation, the steps which comprise adding water to said furfurylamine-containing mixtures, and distilling off the resultant furfurylamine-water azeotrope.

3. In a process for the separation of furfurylamine from admixture with other liquids incapable of forming azeotrope therewith or with water, and which cannot be separated from furfurylamine by straight distillation, the steps which comprise adding water to the said furfurylamine-containing mixture, distilling off the resultant furfurylamine-water azeotrope and thereafter recovering the furfurylamine by distilling the resultant distillate with benzene.

4. In a process for the separation of furfurylamine from a mixture consisting of tetrahydrofurfurylamine and furfurylamine, the steps which comprise adding water to said mixture, and distilling off the resultant furfurylamine-water azeotrope.

5. In a process for the separation of furfurylamine from a mixture containing tetrahydrofurfurylamine, and other liquids incapable of forming azeotropes with said furfurylamine or with water, and which cannot be separated from said furfurylamine by straight distillation, the steps which comprise adding water to the said furfurylamine-containing mixture, distilling off the resultant furfurylamine-water azeotrope, and thereafter recovering the furfurylamine from the resultant distillate.

6. In a process for the separation of furfurylamine from a mixture containing tetrahydrofurfurylamine, and other liquids incapable of forming azeotropes with said furfurylamine or with water, and which cannot be separated from said furfurylamine by straight distillation, the steps which comprise adding water to the said furfurylamine-containing mixture, distilling off the resultant furfurylamine-water azeotrope, and thereafter removing the water by distilling the resultant distillate with benzene.

7. In a process for the separation of furfurylamine from mixtures containing tetrahydrofurfurylamine, and other liquids incapable of forming azeotropes with said furfurylamine or with water, and which cannot be separated from said furfurylamine by straight distillation, the steps which comprise adding water thereto in amounts at least sufficient to completely remove said furfurylamine in the form of an azeotropic mixture with water, and thereafter removing the water from said furfurylamine by distilling the resultant azeotropic mixture with benzene.

8. In a process for the separation of furfurylamine from a mixture substantially consisting of tetrahydrofurfurylamine and furfurylamine, the steps which comprise adding water to said mixture, distilling off the resultant furfurylamine-water azeotrope, and thereafter removing the water by distilling the resultant distillate with benzene.

LEONARD A. STENGEL.
WALTER K. O'LOUGHLIN.